United States Patent
Hansen et al.

(10) Patent No.: US 9,304,704 B2
(45) Date of Patent: *Apr. 5, 2016

(54) COMMUNICATION WITH TWO OR MORE STORAGE DEVICES VIA ONE SAS COMMUNICATION PORT

(71) Applicant: NetApp Inc., Sunnyvale, CA (US)

(72) Inventors: Robert Hansen, Lotus, CA (US); Radek Aster, Campbell, CA (US); Tim K. Emami, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,129

(22) Filed: Jan. 24, 2014

(65) Prior Publication Data

US 2014/0143460 A1 May 22, 2014

Related U.S. Application Data

(63) Continuation of application No. 12/911,904, filed on Oct. 26, 2010, now Pat. No. 8,677,048.

(51) Int. Cl.
*G06F 3/06* (2006.01)

(52) U.S. Cl.
CPC ............ *G06F 3/0646* (2013.01); *G06F 3/0604* (2013.01); *G06F 3/067* (2013.01); *G06F 3/0626* (2013.01); *G06F 3/0635* (2013.01); *G06F 3/0658* (2013.01); *G06F 3/0689* (2013.01)

(58) Field of Classification Search
CPC .... G06F 3/0626; G06F 3/0635; G06F 3/0689
USPC ........................................................ 710/312
See application file for complete search history.

(56) References Cited

U.S. PATENT DOCUMENTS

| 6,924,986 | B1 | 8/2005 | Sardella et al. |
| 7,308,534 | B2 * | 12/2007 | Mimatsu ...................... 711/114 |
| 7,312,999 | B1 | 12/2007 | Miyamura et al. |

(Continued)

FOREIGN PATENT DOCUMENTS

EP 1837750 A2 9/2007

OTHER PUBLICATIONS

Non-Final Office Action cited in U.S. Appl. No. 12/911,904 dated Jul. 24, 2013, 23 pgs.

(Continued)

*Primary Examiner* — Brian Misiura
(74) *Attorney, Agent, or Firm* — LeClairRyan, a Professional Corporation

(57) ABSTRACT

One or more techniques and/or systems are disclosed for enabling communication between a SAS communication port of a SAS communication component and multiple storage devices. In a first example, a first SAS to SATA bridge chip and a second SAS to SATA bridge chip may be configured to route data from a SAS communication component to multiple storage devices. In a second example, a SAS to SATA bridge chip and a port multiplier may be configured to route data from a SAS communication component to multiple storage devices. In a third example, a four port SAS to SATA bridge comprising two SAS ports and two SATA ports may be configured to route data from a SAS communication component to multiple storage devices. Supporting two or more storage devices with a single SAS communication port allows storage enclosures to increase storage capacity, while decreasing cost per slot.

12 Claims, 14 Drawing Sheets

(56) References Cited

U.S. PATENT DOCUMENTS

| | | | |
|---|---|---|---|
| 7,574,630 B1* | 8/2009 | Ranaweera et al. | 714/43 |
| 7,761,642 B2 | 7/2010 | Stenfort | |
| 7,913,037 B2 | 3/2011 | Nakajima et al. | |
| 8,090,905 B2 | 1/2012 | Stenfort | |
| 8,135,869 B2 | 3/2012 | Chang et al. | |
| 8,255,607 B2* | 8/2012 | Jones et al. | 710/316 |
| 2006/0101171 A1 | 5/2006 | Grieff et al. | |
| 2006/0282194 A1 | 12/2006 | Schaefer et al. | |
| 2008/0155145 A1 | 6/2008 | Stenfort | |
| 2009/0273896 A1 | 11/2009 | Walker et al. | |
| 2011/0004710 A1* | 1/2011 | Stenfort et al. | 710/51 |
| 2012/0059991 A1 | 3/2012 | Cuddihy et al. | |

OTHER PUBLICATIONS

Reply Non-Final Office Action cited in U.S. Appl. No. 12/911,904 dated Oct. 24, 2013, 13 pgs.

Notice of Allowance cited in U.S. Appl. No. 12/911,904 dated Dec. 10, 2013, 9 pgs.

Amendment after Notice of Allowance cited in U.S. Appl. No. 12/911,904 dated Jan. 24, 2014, 11 pgs.

Int. Search Report cited in PCT Application No. PCT/US2011/057481 dated Dec. 22, 2011, 9 pgs.

Int. Preliminary Report cited in PCT Application No. PCT/US2011/057481 dated Apr. 30, 2013, 8 pgs.

EP Communication cited in EP Application No. 11784542.0 dated Jun. 7, 2013, 2 pgs.

Reply EP Communication cited in EP Application No. 11784542.0 dated Nov. 29, 2013, 11 pgs.

"Serial ATA", from Wikipedia, http://en.wikipedia.org/wiki/Serial_ATA, 2003, 1 pg.

"Serial Attached SCSI:, from Wikipedia, http://en.wikipedia.org/wiki/Serial_attached_SCSI", Sep. 15, 2010, 7 pgs.

* cited by examiner

COMMUNICATION WITH TWO OR MORE STORAGE DEVICES VIA ONE SAS COMMUNICATION PORT

RELATED APPLICATIONS

This application is a continuation of U.S. application Ser. No. 12/911,904, filed on Oct. 26, 2010, entitled "COMMUNICATION WITH TWO OR MORE STORAGE DEVICES VIA ONE SAS COMMUNICATION PORT", at least some of which may be incorporated herein.

FIELD

The instant disclosure pertains to enabling communication between a SAS communication port of a SAS communication component (e.g., a SAS expander, SAS host bus adapter (HBA), etc.) and two or more storage devices.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

Many storage systems comprise storage servers that are connected to storage enclosures comprising a plurality of storage devices. Storage servers generally provide data to be stored and/or a means to access said data once it is stored, and storage enclosures generally provide a place for data to be stored. A standard interface, such as a small computer system interface (SCSI), may be implemented to facilitate communication and data transfer between storage servers and storage enclosures. The SCSI standard may define commands, protocols, and/or interfaces used for, among other things, data communication, for example. In addition, a transport mechanism, such as a parallel electrical bus design, may be used to transport the data between a storage server and storage enclosure. For example, a parallel SCSI may allow the storage server to communicate read/write operations to the storage enclosure over a parallel electric bus using the SCSI standard.

Currently, Serial Attached SCSI (SAS) is beginning to replace parallel SCSI. SAS continues to use the SCSI standard for defining commands, protocols, and interfaces. However, SAS utilizes a serial interface as opposed to a parallel interface, which allows for simple cable design, longer transmission distances, and higher clock speeds, for example. Thus, many storage servers may utilize SAS for communicating with storage enclosures.

The storage server may comprise a host bus adapter that provides connectivity to the storage enclosure. The host bus adapter may comprise a host bus adapter controller chip configured to provide SAS communication to the storage enclosure. That is, the host bus adapter controller chip may translate data commands from the storage server into a SAS format that may be sent to the storage enclosure. The host bus adapter controller chip may be serially connected to a SAS expander located within the storage enclosure. The SAS expander within the storage enclosure may comprise SAS communication ports individually connected to storage devices within the storage enclosure. In some instances, a second SAS expander may be connected to storage devices within the storage enclosure to provide redundant paths from the storage server to the storage devices.

The storage enclosure may comprise serial advanced technology attachment (SATA) storage devices. SATA is a computer bus interface / disk protocol for connecting host bus adapters to storage devices. A SAS to SATA bridge chip may be used to translate communications between the SAS expander and the SATA storage devices due to differences between SAS and SATA.

In one example of communication between a storage server and a storage device within a storage enclosure, the storage server may issue a read/write operation to a host bus adapter located within the storage server. A host bus adapter controller located within the host bus adapter may translate the read/write operation into a SAS format. The SAS read/write operation may be sent from the host bus adapter controller to the storage enclosure. A SAS expander located within the storage enclosure may receive the SAS read/write operation, and forward the SAS read/write operation through a SAS communication port to a SAS to SATA bridge chip corresponding to the target storage device. The SAS to SATA bridge chip may receive the SAS read/write operation, and convert the SAS read/write operation into a SATA read/write operation, which may be sent to the target storage device. In this way, the storage server may utilize SAS to communicate with a storage server comprising SATA storage devices. Additionally, the storage server may receive communications from the SATA storage devices in a similar manner (e.g., a response from the storage device corresponding to a read command). It may be appreciated that the storage enclosure may comprise a plurality of storage devices (e.g., 24 disk drives or more), which may be assessable to the storage server.

Presently, the cost of storage enclosures may be measured in terms of cost per slot. The cost per slot is a function of the total cost of the storage enclosure relative to (e.g., divided by) the number of supported storage devices. Unfortunately, the number of supported SATA storage devices is currently limited based upon the number of SAS communication ports a SAS expander comprises. That is, current storage enclosures require a separate SAS communication port for each SATA storage device. For example, a SAS expander may comprise 36 SAS communication ports that may be physically connected to 36 or fewer SAS storage devices.

SUMMARY

This disclosure relates to one or more techniques and/or systems that provide for enabling communication between a SAS communication port of a SAS communication component (e.g., a SAS expander, SAS host bus adapter (HBA), etc.) and two or more storage devices. Allowing more than one storage device to communicate through a single SAS communication port of a SAS communication component may increase the storage device capacity supported by a storage enclosure because the storage device capacity would not be limited to a one-to-one ratio with the number of SAS communication ports of the SAS communication component. For example, a storage enclosure may comprise a 24 port SAS expander that may support up to 24 SATA storage devices. Previously, the storage enclosure would be limited to 24 or fewer SATA storage devices because the SAS expander only comprised 24 SAS communication ports. However, the storage enclosure may be modified by one or more of the techniques and/or systems provided herein so that more than 24 SATA storage devices (e.g., 48 SATA storage devices) may be supported. Supporting two or more storage devices per SAS communication port of a SAS communication component allows for increased storage density within the storage enclosure, and thus may reduce the cost of the store enclosure system. That is, the cost of the storage enclosure may relate to the infrastructure cost of the storage enclosure (e.g., structural costs, SAS expander costs, etc.) relative to (e.g., divided by) the number of supported storage devices. Thus, by increasing the number of supported storage devices, without increasing the number of SAS communication components, the cost of the storage enclosure may be reduced. Additionally, potential risks in modifying a storage enclosure to allow more than one storage device to communicate through a single SAS communication port of a SAS communication component may be mitigated because conventional or currently available SAS communication components (e.g., expanders) may be implemented (e.g., new SAS expanders are not necessarily required).

In a first embodiment of enabling communication between a SAS communication port of a SAS communication component and two or more storage devices, a storage enclosure may comprise one or more SAS communication components configured to route data communication between a storage server and storage devices within the storage enclosure (e.g., FIG. 4-6). In one example, the data communication may comprise a read/write operation from the storage server to the storage enclosure. The read/write operation may have been formatted according to a SAS protocol by a host bus adapter controller chip located within the storage server. The host bus adapter controller chip may send the SAS read/write operation to a first SAS communication component within the storage enclosure.

The storage enclosure may comprise a first bridge chip operatively coupled to a first storage device, and operatively coupled to a SAS communication port of the first SAS communication component. The first bridge chip may provide a first communication channel between the first SAS communication component and the first storage device. The storage enclosure may comprise a second bridge chip operatively coupled to the first bridge chip and a second storage device. The second bridge chip may be configured to provide a second communication channel between the first SAS communication component and the second storage device through the first bridge chip. An address module may be utilized in routing communication to a target storage device based upon logical unit numbers assigned to the first and second storage devices and the first and second bridge chips. In this way, the first and second storage devices are connected to a single SAS communication port of the first SAS communication component.

The storage enclosure may comprise a second SAS communication component, for example, to provide redundancy between the storage server and the first and second storage devices. The second bridge chip may be operatively coupled to a SAS communication port of the second SAS communication component. The second bridge chip may be configured to provide a third communication channel between the second SAS communication component and the second storage device. The first bridge chip may be configured to provide a fourth communication channel between the second SAS communication component and the first storage device through the second bridge chip. The address module may be utilized in routing communication to a target storage device based upon logical unit numbers assigned to the first and second storage devices and the first and second bridge chips. In this way, the first and second storage devices are connected to a single SAS communication port of the second SAS communication component.

In a second embodiment of enabling communication between a SAS communication port of a SAS communication component and two or more drives, a storage enclosure may comprise one or more SAS communication components configured to route data communication between a storage server and storage devices within the storage enclosure (e.g., FIG. 7-9). The storage enclosure may comprise a bridge chip and a port multiplier. The bridge chip may be operatively coupled to a SAS communication port of a first SAS communication component, and operatively coupled to the port multiplier. The bridge chip may be configured to provide a first communication channel between the first SAS communication component and the first storage device through the port multiplier. The bridge chip may be configured to provide a second communication channel between the first SAS communication component and a second storage device through the port multiplier. An address module may be utilized in routing communication to a target storage device based upon logical unit numbers assigned to the first and second storage devices and the bridge chip. In this way, the first and second storage devices are connected to a single SAS communication port of the first SAS communication component.

The storage enclosure may comprise a second SAS communication component. The bridge chip may be operatively coupled to a SAS communication port of the second SAS communication component. The bridge chip may be configured to provide a third communication channel between the second SAS communication component and the first storage device through the port multiplier. The bridge chip may be configured to provide a fourth communication channel between the second SAS communication component and the second storage device through the port multiplier. The address module may be utilized in routing communication to a target storage device based upon logical unit numbers assigned to the first and second storage devices and the bridge chip. In this way, the first and second storage devices are connected to a single SAS communication port of the second SAS communication component.

In a third embodiment of enabling communication between a SAS communication port of a SAS communication component and two or more drives, a storage enclosure may comprise one or more SAS communication components configured to route data communication between a storage server and storage devices within the storage enclosure (e.g., FIG. 10-12). The storage enclosure may comprise a bridge chip. The bridge chip may comprise a first port operatively coupled to a SAS communication port of a first SAS communication component, a second port operatively coupled to a first storage device, a third port operatively coupled to a second storage device, and a fourth port operatively coupled to a SAS communication port of a second SAS communication component.

The bridge chip may be configured to provide a first communication channel between the first SAS communication component and the first storage device using the first port and the second port. The bridge chip may be configured to provide a second communication channel between the first SAS communication component and the second storage device using the first port and the third port. The bridge chip may be configured to provide a third communication channel between the second SAS communication component and the first storage device using the fourth port and the second port. The bridge chip may be configured to provide a fourth communication channel between the second SAS communication component and the second storage device using the fourth port and the third port. An address module may be utilized in routing communication to a target storage device based upon logical unit numbers assigned to the first and second storage devices and the bridge chip. In this way, the first and second storage devices are connected to a single SAS communication port of the first SAS communication component and a single SAS communication port of the second SAS communication component.

It will be appreciated that while the examples illustrated and described herein merely pertain to expanding communication to two storage devices, such expansion is not intended to be so limited. That is, communication can be expanded to more than two storage devices, and the illustration and description of two storage devices is merely done for simplicity and ease of understanding. Additionally, while some examples illustrated and described herein pertain to SAS communication components comprising a SAS communication port, such SAS communication components may comprise a plurality of SAS communication ports. For example, a SAS expander may comprise 24 SAS communication ports connected to 24 storage device (e.g., disk) carriers, where respective SAS communication ports may support two or more SATA storage devices within the respective storage device (e.g., disk) carriers.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
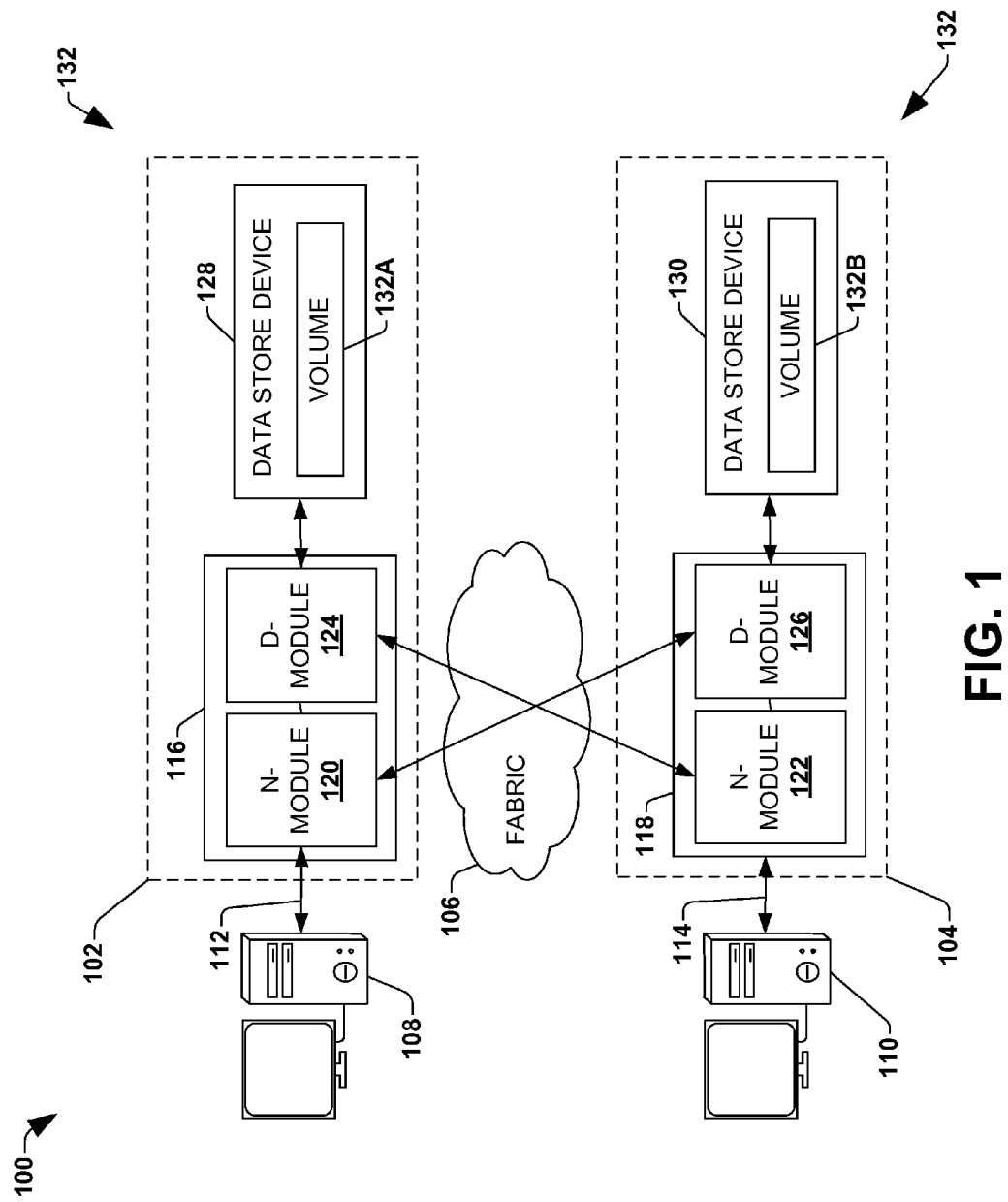
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

It will be appreciated that while some examples illustrated and described herein pertain to communication ports of SAS expanders, such communication components are not intended to be limited to SAS expanders, but may encompass any suitable communication component(s), such as where a host bus adapter (HBA) is coupled directly to a storage device instead of through an expander, for example (which may be particularly well suited for server and embedded RAID controller applications, for example). Accordingly, where figures illustrate expanders, for example, respective HBAs could instead be included as being coupled to different storage devices, where HBAs may have 4, 8 or even more ports. Similarly, while some examples illustrated and described herein pertain to SATA storage devices, it is to be appreciated that the instant application and/or claimed subject matter are not intended to be limited to SATA storage devices, but may encompass any storage device. That is, SATA is a merely one type of communications protocol and a storage device may have a SATA interface, SAS interface or any other type of interface, for example. Also, while SAS to SATA, for example, bridge chips may be referenced herein, it will be appreciated that the claimed subject matter is not intended to be so limited. That is, it is contemplated that a variety of different protocol bridge chips (e.g., SAS to SAS, SAS to SATA, SAS to Fibre Channel, SAS to USB, etc.) may be used to facilitate communications as provided herein. For example, the communication module 1306 of FIG. 13 may comprise one or more bridge chips used to convert SAS communication to a variety of different communication protocols, such as SAS, SATA, Fibre Channel, USB, and/or other communication protocols. In this way, a SAS communication port may be connected to two or more storage devices that use one or more of a variety of different communication protocols, not just SATA.

Storage servers may be deployed within large networks to provide access to data/files stored within storage enclosures. In one example, a storage enclosure may comprise a plurality of SATA storage devices. The SATA storage devices may be physically housed within storage device carriers (e.g., a storage device carrier may comprise two SATA storage devices). It may be advantageous to increase storage capacity of the storage enclosure, while reducing overall cost per slot. Currently, a storage enclosure may comprise one or more SAS expanders having a fixed number of SAS communication ports (e.g., a 24 port SAS expander). Currently, a SAS communication port provides a single communication channel to and from a single SATA storage device. Accordingly, one or more techniques and/or systems for enabling communication between a SAS communication port of a SAS communication component (e.g., SAS expander, SAS host bus adapter (HBA), etc.) and two or more storage devices are disclosed herein. It will be appreciated that the claimed subject matter is not limited to communication ports of SAS expanders, but may encompass any SAS communication ports (e.g., one or more SAS communication ports of a host bus adapter). It will also be appreciated that "storage device" or the like and/or variations thereof as used herein are intended to have a broad interpretation, such as not being limited to a disk drive, for example. That is, a variety of different storage devices are contemplated as falling within the scope of the instant disclosure and claimed subject matter (e.g., RAM, ROM, EPROM, EEPROM, flash memory, CD-ROM, digital versatile disks (DVDs), cassette, tape, disk and/or other medium which can be used to store desired information, including but not limited to magnetic, optical, electronic, etc. media. Similarly, where applicable, use of more specific terms, such as "disk" or the like, for example, may likewise have a broader meaning similar to that of "storage device" for example. Also, the claimed subject matter is not intended to be limited to SATA storage devices, but may encompass and/or be applicable to any type(s) of storage device(s).

Figure 2:
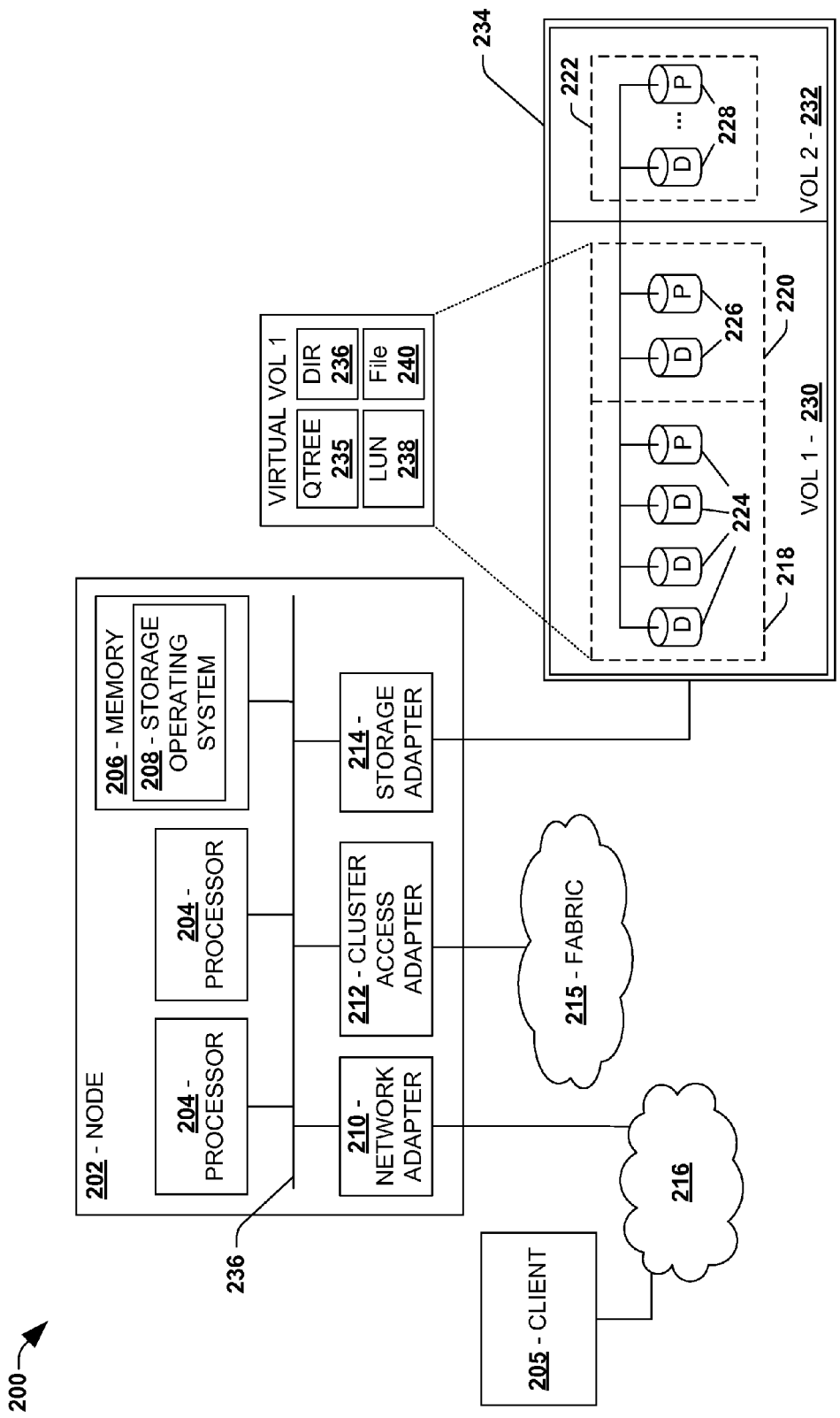
FIG. 2 is a component block diagram illustrating an example data storage system in accordance with one or more of the provisions set forth herein.

To provide a context for an embodiment of enabling communication between two or more SATA storage devices and a SAS communication component, FIG. 1 illustrates a clustered network environment 100, for example, whereon clients connect to a plurality of distributed nodes, and FIG. 2 illustrates an embodiment of a data storage system that may be implemented to store and manage data using storage servers and storage enclosures within the clustered network environment. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of one or more of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as , nodes 116 and 118, for example). It will be appreciated that while two data storage systems 102 and 104 and two nodes or storage servers 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system. For example, a node (e.g., node 116) may comprise a storage server coupled to one or more storage enclosures (e.g., data storage devices 128 and 130), where a storage enclosure may comprise SAS expanders connected to storage device (e.g., disk) carriers physically housing one or more SATA storage devices.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, storage enclosures, or some other form of data storage, to the nodes 116, 118. It may be appreciated that the terms storage enclosure and data storage device may, at times, be used herein interchangeably. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices or storage enclosures 128, 130 according to a storage area network (SAN) protocol, such as small computer system interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files, for example.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto storage devices or disk arrays as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

In one embodiment, as illustrated by the example environment 100 of FIG. 1, data storage device 128 may, for example, be a storage enclosure comprising 48 SATA storage devices and a 24 port SAS expander. In particular, the storage enclosures may comprise 24 disk carriers, where a disk carrier physically houses 2 SATA storage devices. The 24 port SAS expander may comprise 24 SAS communication ports that provide communication connections between the node 116 (e.g., a storage server) and the SATA storage devices within the storage enclosures. It may be appreciated that the storage enclosure may support more than 24 SATA storage devices using the 24 port SAS expander because of one or more of the techniques and/or systems described herein that enable communication between a SAS communication port and two or more SATA storage devices.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices or storage/disk enclosures 128, 130 in FIG. 1). The node 202 may be a general purpose computer, for example, or some other computing device particularly configured to operate as a storage server. A client 205 (e.g., 108, 110 in FIG. 1) can be connected to the node 202 via a network adapter 210 over a network 216, for example, to provide access to files/data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic storage devices, flash memory, and any other similar media adapted to store information, including data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in array. Additionally, the node 202 may comprise a host bus adapter (e.g., storage adapter 214) configured to provide a communication channel between the node or storage server 202 and the data storage device 234. For example, the host bus adapter may comprise a host bus adapter controller chip configured to send and/or receive data operations to/from the storage server 202 and the data storage device 234 using a SAS format.

The operating system 208 can manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 (e.g., a host bus adapter) cooperates with the operating system 208 executing on the host 202 to access information requested by the client 205. The information may be stored on any type of attached array of writeable media such as magnetic storage devices, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., small computer system interface (SCSI), iSCSI, hyper-SCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 224, 226 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 224 by using one or more addresses that identify the LUNs 238, for example.

Figure 3:
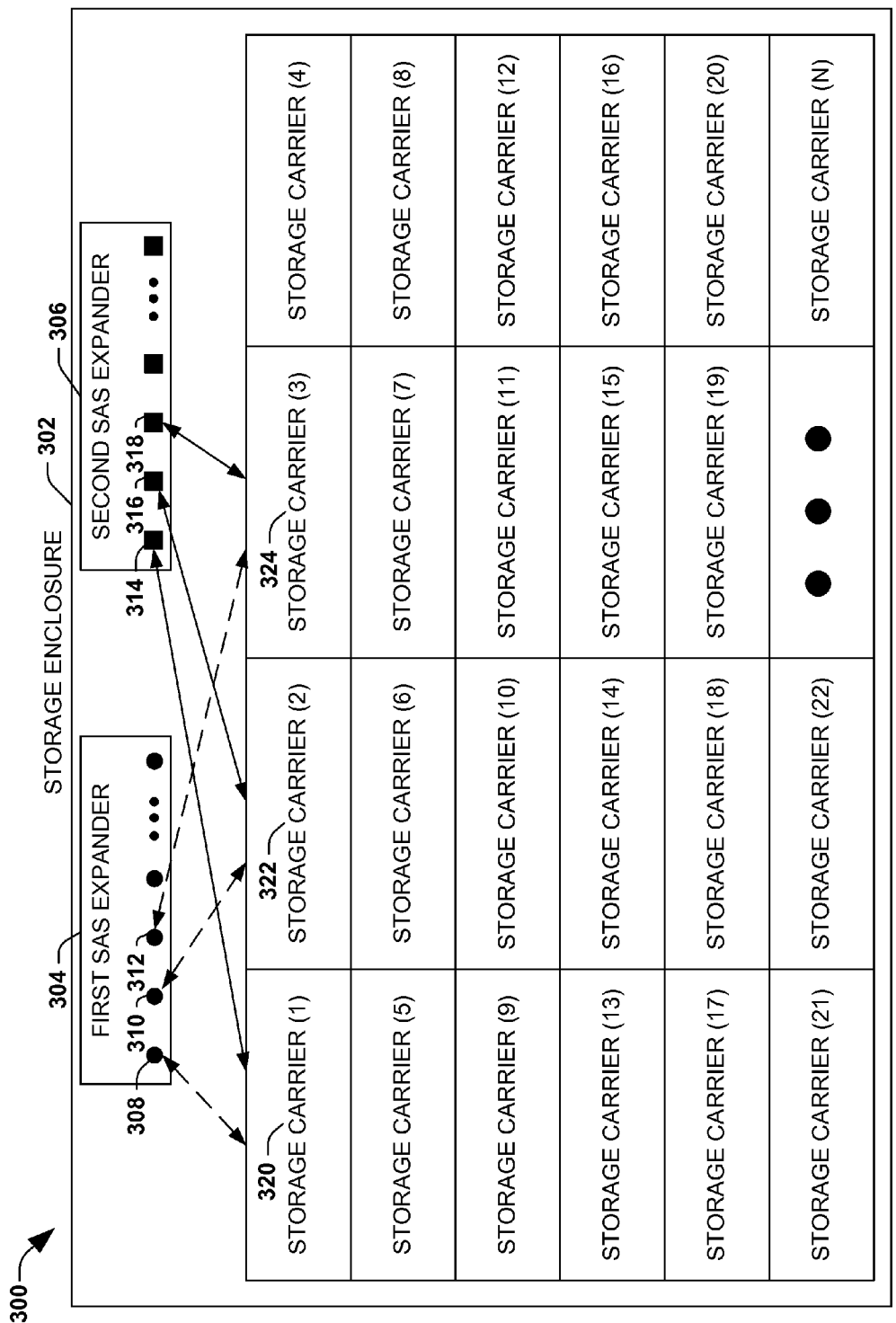
FIG. 3 is an illustration of an example of a storage enclosure.

FIG. 3 illustrates an example of a storage enclosure 302 (e.g., data storage device 128 or 130 of FIG. 1; data storage device 234 of FIG. 2). The storage enclosure 302 may comprise a plurality of storage device carriers (e.g., storage device carrier (1) 320, storage device carrier (2) 322, storage device carrier (3) 324, etc.). A storage device carrier, such as storage device carrier (1) 320, may comprise one or more SATA storage devices. In one example, a storage device carrier may comprise technology to convert communication from a SAS format to a format understood by the SATA storage devices (e.g., a SAS to SATA bridge chip). That is, a SAS expander within the storage enclosure 302 may receive data communication from a storage server in a SAS format. The SAS expander may forward the SAS data communication through a SAS communication port to a storage device carrier comprising a target SATA storage device. Technology within the storage device carrier may format the SAS data communication into a format understood by the target SATA storage device.

The storage enclosure 302 may comprise one or more SAS expanders (e.g., a first SAS expander 304 and a second SAS expander 306). A SAS expander may comprise a plurality of SAS communication ports. For example, the first SAS expander 304 may comprise a SAS communication port 308 operatively coupled to storage device carrier (1) 320, a SAS communication port 310 operatively coupled to storage device carrier (2) 322, a SAS communication port 312 operatively coupled to storage device carrier (3), 324, and/or other SAS communication ports. The second SAS expander 306 may comprise a SAS communication port 314 operatively coupled to storage device carrier (1) 320, a SAS communication port 316 operatively coupled to storage device carrier (2) 322, a SAS communication port 318 operatively coupled to storage device carrier (3), 324, and/or other SAS communication ports.

Unfortunately, current storage enclosures are limited to a single SATA storage device per SAS communication port of a SAS expander. Accordingly, one or more techniques and/or systems for enabling communication between a single SAS communication port and two or more SATA storage devices are provided herein. For example, a first communication channel may be enabled between the SAS communication port 308 of the first SAS expander 304 and a first SATA storage device within the storage device carrier (1) 320. Additionally, a second communication channel may be enabled between the SAS communication port 308 of the first SAS expander 304 and a second SATA storage device within the storage device carrier (1) 320. In this way, respective SAS communication ports of the first SAS expander 304 and/or the second SAS expander 306 may communicate with two or more SATA storage devices, allowing the storage density of the enclosure 302 to increase without linearly increasing costs.

Figure 4:
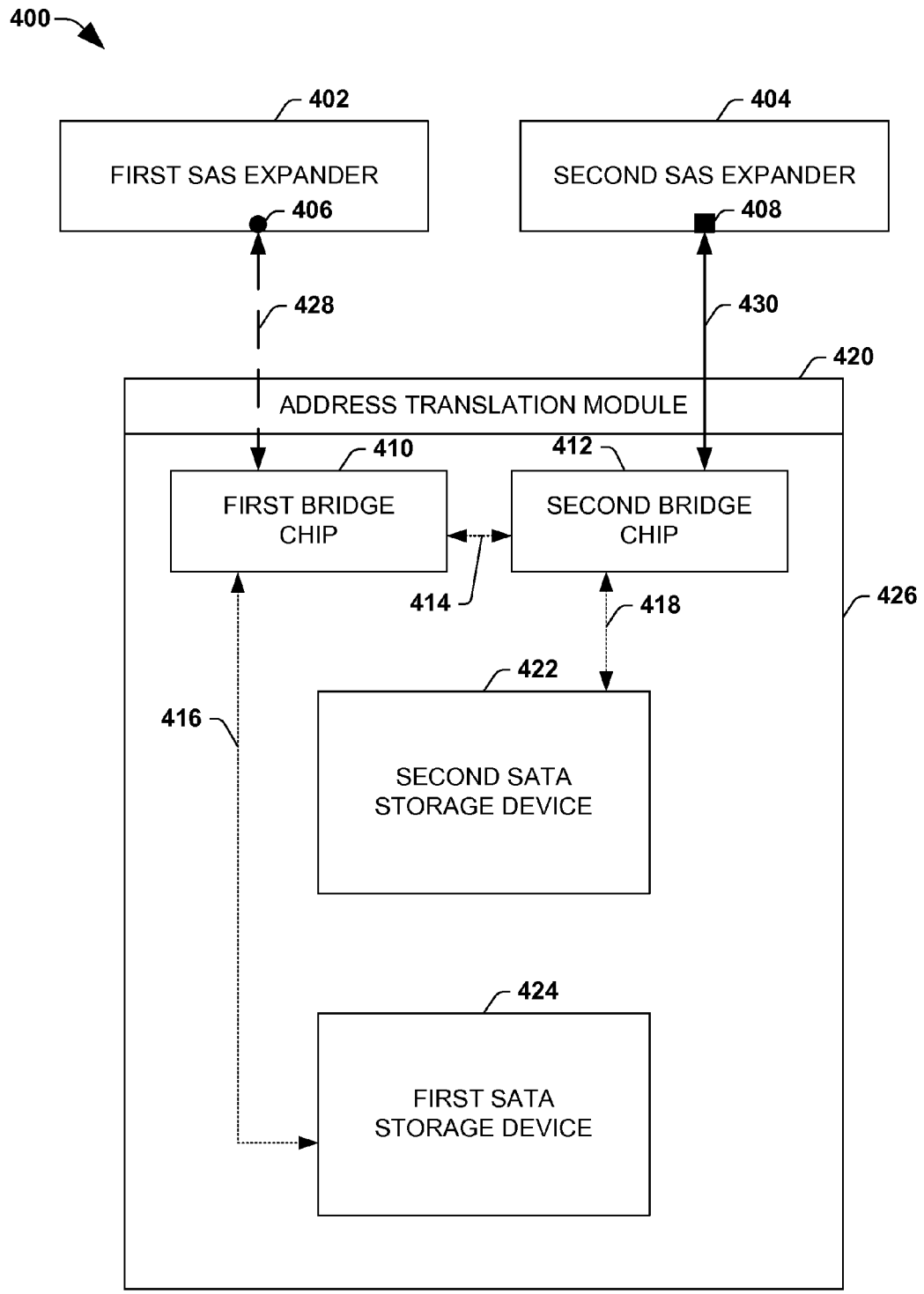
FIG. 4 is a component block diagram illustrating an exemplary system for enabling communication between a SAS communication port and two or more storage devices.

FIG. 4 illustrates an example of a system 400 configured to enable communication between a SAS communication port of a SAS expander and two or more SATA storage devices. A storage enclosure may comprise a first SAS expander 406 and a storage device carrier 426. The first SAS expander 402 may comprise a SAS communication port 406 and/or other SAS communication ports. The storage device carrier 426 may comprise a first SATA storage device 424 and a second SATA storage device 422.

The system 400 may comprise a first bridge chip 410 and a second bridge chip 412. In one example, the first and second bridge chips may be SAS to SATA bridge chips configured to translate data communication between SAS and SATA formats in order to facilitate communication between SAS expanders and SATA storage devices. The first bridge chip 410 may be operatively coupled to the SAS communication port 406 of the first SAS expander 402 (e.g., connection 428). The first bridge chip 410 may be operatively coupled to the first SATA storage device 424 (e.g., connection 416). The first bridge chip 410 may be configured to provide a first communication channel between the first SAS expander 402 and the first SATA storage device 424 (e.g., connection 428 and connection 416).

The second bridge chip 412 may be operatively coupled to the first bridge chip 410 (e.g., connection 414). The second bridge chip 412 may be operatively coupled to the second SATA storage device 422 (e.g., connection 418). The second bridge chip 412 may be configured to provide a second communication channel between the first SAS expander 402 and the second SATA storage device 422 through the first bridge chip 410 (e.g., connection 428, connection 414, and connection 418). In this way, communication channels may be provided between the SAS communication port 406 and two or more SATA storage devices, even though a single physical connection, for example, may be provided between the SAS communication port 406 and the storage device carrier 426.

The storage enclosure may comprise a second SAS expander 404. The second SAS expander 404 may comprise a SAS communication port 408 and/or other SAS communication ports. The second bridge chip 412 may be operatively coupled to the SAS communication port 408 of the second SAS expander (e.g., connection 430). The second bridge chip 412 may be configured to provide a third communication channel between the second SAS expander 404 and the second SATA storage device 422 (e.g., connection 430 and connection 418).

The first bridge chip 410 may be configured to provide a fourth communication channel between the second SAS expander 404 and the first SATA storage device 424 through the second bridge chip 412 (e.g., connection 430, connection 414, and connection 416). In this way, communication channels may be provided between the SAS communication port 408 and two or more SATA storage devices, even though a single physical connection, for example, may be provided between the SAS communication port 408 and the storage device carrier 426. The ability to support two or more SATA storage devices using a single SAS communication port allows for additional SATA storage devices to be supported within the storage enclosure without additional SAS expanders, which may reduce overall "cost per slot".

The system 400 may comprise an address translation module 420. It may be appreciated that logical unit numbers (LUNs) may be assigned to bridge chips and/or SATA storage devices. A LUN may be an identifier of a SCSI logical unit (e.g., a SCSI protocol entity that performs storage read/write operations). In one example, a first LUN may be assigned to the first bridge chip 410, a second LUN may be assigned to the second bridge chip 412, a third LUN may be assigned to the first SATA storage device 424, and/or a fourth LUN may be assigned to the second SATA storage device 422. The address translation module 420 may be configured to route communication from SAS expanders to target SATA storage devices. In one example, the address translation module 420 may route communication from the first SAS expander 402 to the first SATA storage device 424 based upon the third LUN of the first SATA storage device 424 and the first LUN of the first bridge chip 410. In another example, the address translation module 420 may be configured to route communication from the first SAS expander 402 to the second SATA storage device 422 based upon the fourth LUN of the second SATA storage device 422, a first LUN of the first bridge chip 410, and/or the second LUN of the second bridge chip 412.

Figure 5:
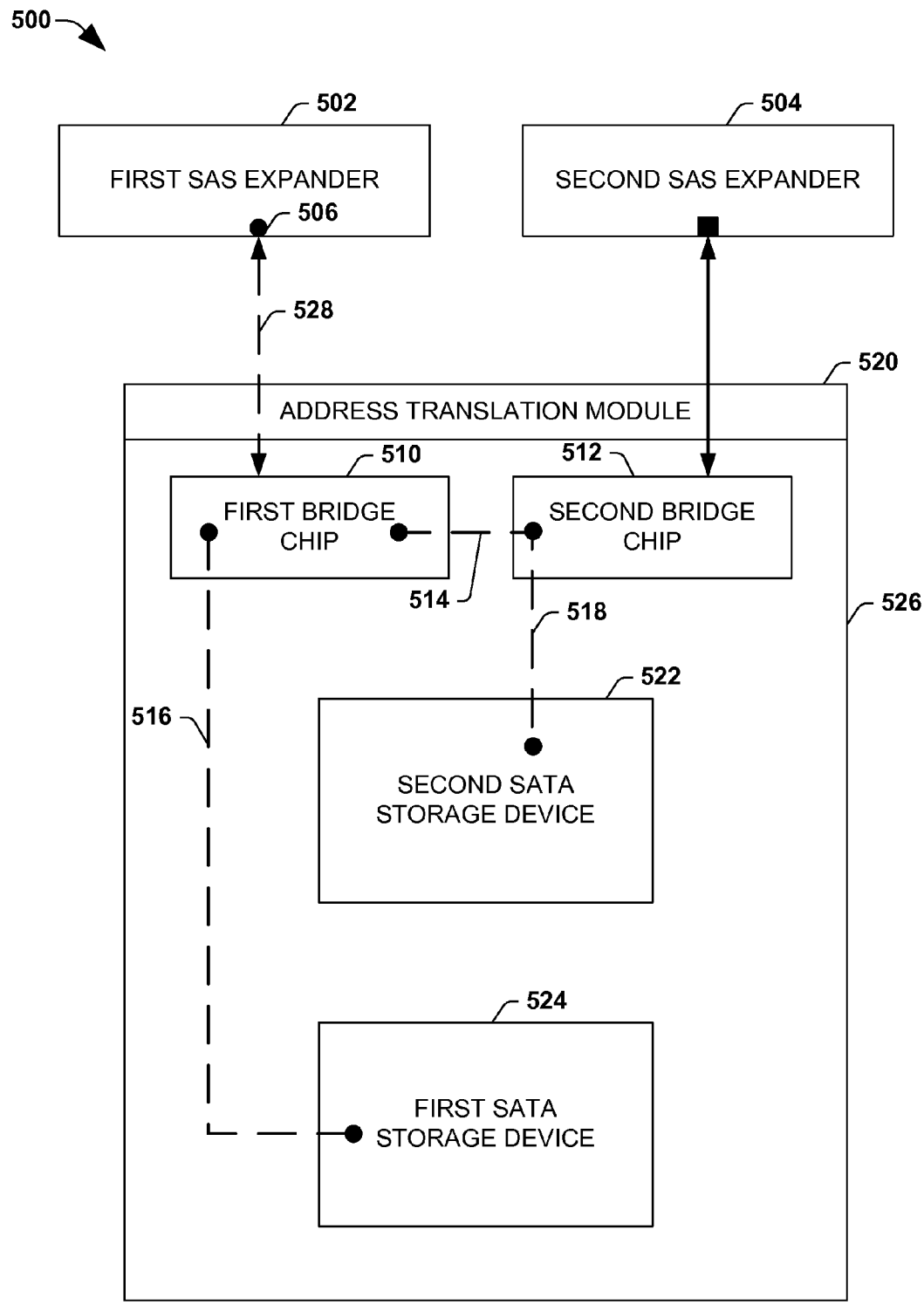
FIG. 5 is an illustration of an example of providing communication channels between a SAS communication port and two or more storage devices.

FIG. 5 illustrates an example 500 of providing communication channels between a SAS communication port and two or more SATA storage devices. A storage enclosure may comprise a first SAS expander 502, a second SAS expander 504, and/or a storage device carrier 526. The storage device carrier 526 may comprise a first SATA storage device 524 and a second SATA storage device 522.

A first bridge chip 510 may be operatively coupled to a SAS communication port 506 of the first SAS expander 502 (e.g., connection 528). The first bridge chip 510 may be operatively coupled to the first SATA storage device 524 (e.g., connection 516). The first bridge chip 510 may be operatively coupled to the second bridge chip 512 (e.g., connection 514).

The second bridge chip 512 may be operatively coupled to the second SATA storage device 522 (e.g., connection 518).

The first bridge chip 510 may be configured to provide a first communication channel between the first SAS expander 502 and the first SATA storage device 524. The first communication channel may comprise connection 528 and connection 516. In one example of routing data communication, the first SAS expander 502 may receive a write operation from a storage server. The write operation may be formatted in a SAS format (e.g., a host bus adapter controller chip may have formatted the write operation issued from the storage server into the SAS format). An address translation module 520 may determine that the first SATA storage device 524 is the target. The write operation may be routed from the first SAS expander 502 through connection 528 to the first bridge chip 510. The first bridge chip 510 may translate the write operation from the SAS format into a SATA compatible format. The write operation may be routed from the first bridge chip 510 through connection 516 to the first SATA storage device 524. It may be appreciated that data communication may be routed from the first SATA storage device 524 back to the storage server in a similar manner.

The second bridge chip 512 may be configured to provide a second communication channel between the first SAS expander 502 and the second SATA storage device 524 through the first bridge chip 510. The second communication channel may comprise connection 528, connection 514, and connection 518. In one example of routing data communication, the first SAS expander 502 may receive a write operation from a storage server. The write operation may be formatted in a SAS format. The address translation module 520 may determine that the second SATA storage device 522 is the target. The write operation may be routed from the first SAS expander 502 through connection 528 to the first bridge chip 510. The write operation may be routed from the first bridge chip 510 through connection 514 to the second bridge chip 512. It may be appreciated that the first bridge chip 510 and/or the second bridge chip 512 may translate the write operation from the SAS format into a SATA compatible format. The write operation may be routed from the second bridge chip 512 through connection 518 to the second SATA storage device 522. It may be appreciated that data communication may be routed from the second SATA storage device 522 to the storage device in a reverse manner.

Figure 6:
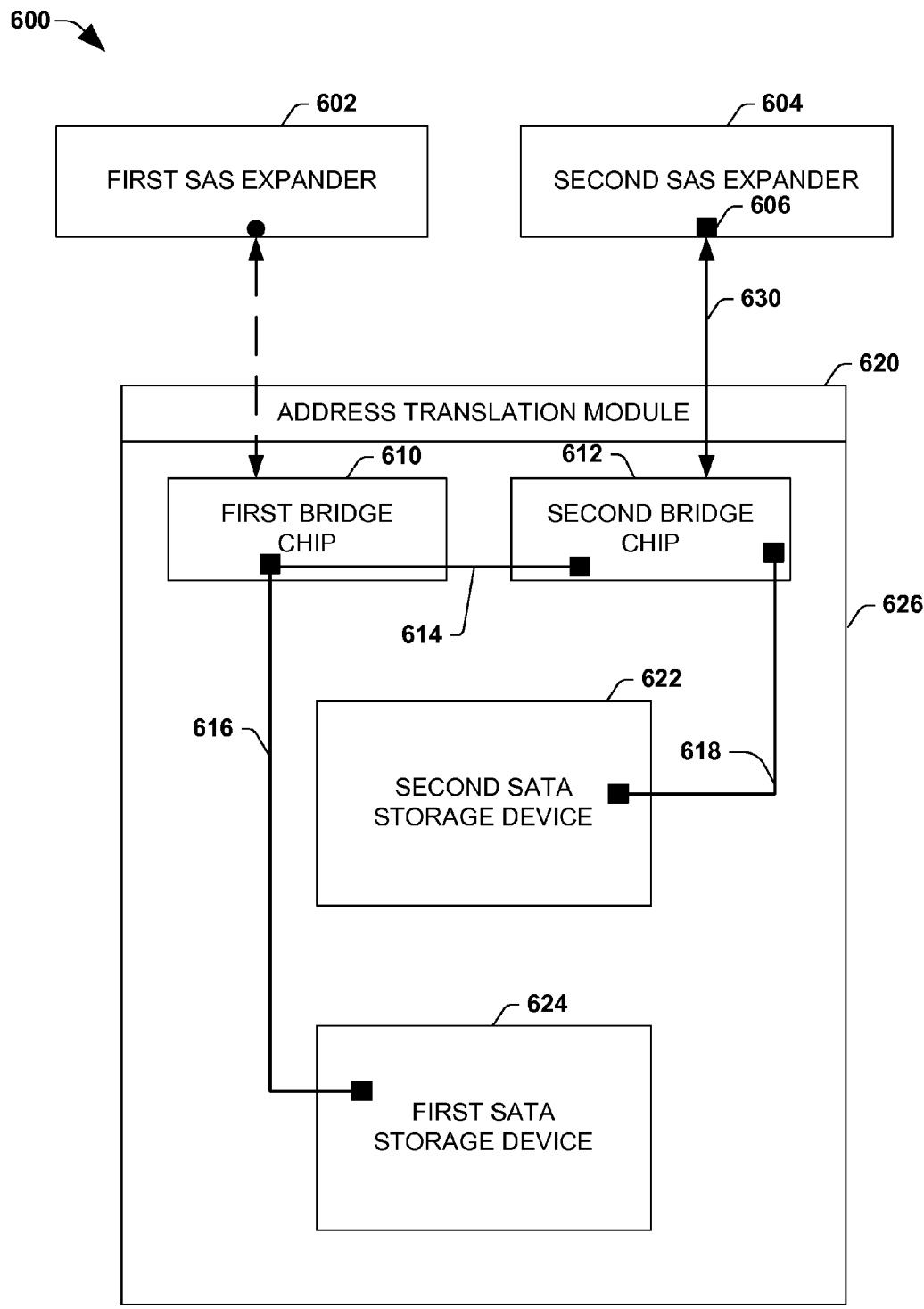
FIG. 6 is an illustration of an example of providing communication channels between a SAS communication port and two or more storage devices.

FIG. 6 illustrates an example 600 of providing communication channels between a SAS communication port and two or more SATA storage devices. A storage enclosure may comprise a first SAS expander 602, a second SAS expander 604, and/or a storage device carrier 626. The storage device carrier 626 may comprise a first SATA storage device 624 and a second SATA storage device 622.

A first bridge chip 610 may be operatively coupled to the first SATA storage device 624 (e.g., connection 616). The first bridge chip 610 may be operatively coupled to a second bridge chip 612 (e.g., connection 614). The second bridge chip 612 may be operatively coupled to a SAS communication port 608 of the second SAS expander 604 (e.g., connection 630). The second bridge chip 612 may be operatively coupled to the second SATA storage device 622 (e.g., connection 618).

The second bridge chip 612 may be configured to provide a third communication channel between the second SAS expander 604 and the second SATA storage device 622. It may be appreciated that a first and second communication channel are illustrated in FIG. 5. The third communication channel may comprise connection 630 and connection 618. In one example of routing data communication, the second SAS expander may receive a write operation from a storage server. The write operation may be formatted in a SAS format. An address translation module 620 may be configured to determine that the second SATA storage device 622 is the target. The write operation may be routed from the second SAS expander 604 through connection 630 to the second bridge chip 612. The second bridge chip 612 may translate the write operation from the SAS format into a SATA compatible format. The write operation may be routed from the second bridge chip 612 through connection 618 to the second SATA storage device 622. It may be appreciated that data communication may be routed from the second SATA storage device 622 back to the storage server in a similar manner.

The first bridge chip 610 may be configured to provide a fourth communication channel between the second SAS expander 604 and the first SATA storage device 624 through the second bridge chip 612. The fourth communication channel may comprise connection 630, connection 614, and connection 616. In one example of routing data communication, the second SAS expander 604 may receive a write operation from a storage server. The write operation may be formatted in a SAS format. The address translation module 620 may determine that the first SATA storage device 624 is the target. The write operation may be routed from the second SAS expander 604 through connection 630 to the second bridge chip 612. The write operation may be routed from the second bridge chip 612 through connection 614 to the first bridge chip 610. It may be appreciated that the first bridge chip 610 and/or the second bridge chip 612 may translate the write operation from the SAS format into a SATA compatible format. The write operation may be routed from the first bridge chip 610 through connection 616 to the first SATA storage device 624. It may be appreciated that data communication may be routed from the first SATA storage device 624 to the storage device in a reverse manner.

Figure 7:
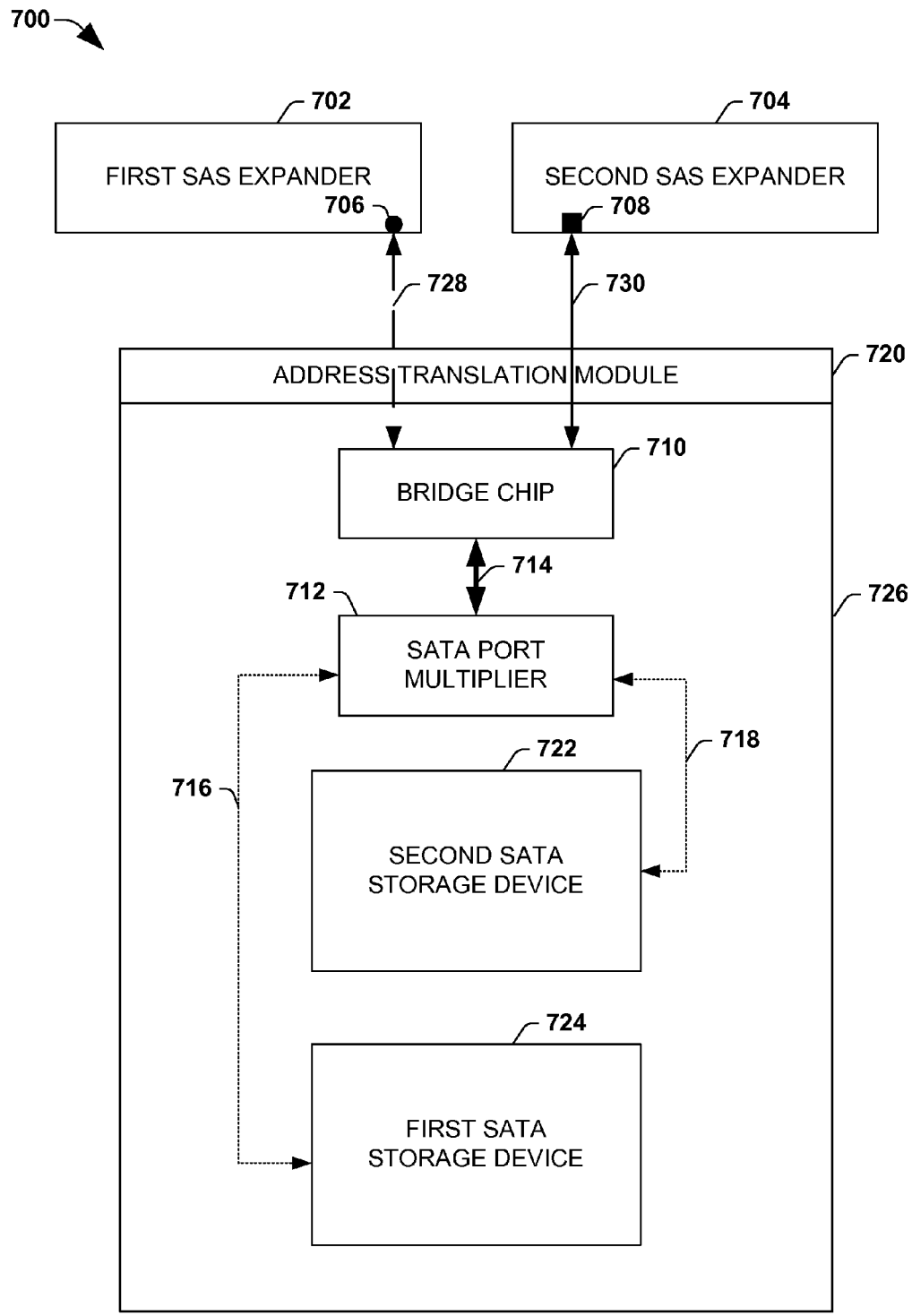
FIG. 7 is a component block diagram illustrating an exemplary system for enabling communication between a SAS communication port and two or more storage devices.

FIG. 7 illustrates an example of a system 700 configured to enable communication between a SAS communication port of a SAS expander and two or more SATA storage devices. A storage enclosure may comprise a first SAS expander 702 and a storage device carrier 726. The first SAS expander 702 may comprise a SAS communication port 706 and/or other SAS communication ports. The storage device carrier 726 may comprise a first SATA storage device 724 and a second SATA storage device 722.

The system 700 may comprise a bridge chip 710 and a SATA port multiplier 712. In one example, the bridge chip 710 may be a SAS to SATA bridge chip configured to translate communication between SAS and SATA in order to facilitate communication between SAS expanders and SATA storage devices. In one example, the SATA port multiplier 712 may comprise a switch configured to route data to one or more supported SATA storage devices within the storage device carrier 726. The bridge chip 710 may be operatively coupled to the SAS communication port 706 of the first SAS expander 702 (e.g., connection 728). The bridge chip 710 may be operatively coupled to the SATA port multiplier 712 (e.g., connection 714).

The bridge chip 710 may be configured to provide a first communication channel between the first SAS expander 702 and the first SATA storage device 724 through the SATA port multiplier 712 (e.g., connection 728, connection 714, and connection 716). The bridge chip 710 may be configured to provide a second communication channel between the first SAS expander 702 and the second SATA storage device 722 though the SATA port multiplier 712 (e.g., connection 728, connection 714, and connection 718). In this way, the communication channels may be provided between the SAS communication port 706 and two or more SATA storage devices, even though a single physical connection, for example, may be provided between the SAS communication port 706 and the storage device carrier 726.

The storage enclosure may comprise a second SAS expander 704. The second SAS expander 704 may comprise a SAS communication port 708. The bridge chip 710 may be operatively coupled to the SAS communication port 708 of the second SAS expander 704 (e.g., connection 730). The bridge chip 710 may be configured to provide a third communication channel between the second SAS expander 704 and the first SATA storage device 724 through the SATA port multiplier 712 (e.g., connection 730, connection 714, and connection 716). The bridge chip 710 may be configured to provide a fourth communication channel between the second SAS expander 704 and the second SATA storage device 722 through the SATA port multiplier 712 (e.g., connection 730, connection 714, and connection 718).

The system 700 may comprise an address translation module 720. It may be appreciated that logical unit numbers (LUNs) may be assigned to the bridge chip 710, the first SATA storage device 724, and/or the second SATA storage device 722. For example, a first LUN may be assigned to the bridge chip 710, a second LUN may be assigned to the first SATA storage device 724, and/or a third LUN may be assigned to the second SATA storage device 722. The address translation module 720 may be configured to route communication from SAS expanders to target SATA storage devices. In one example, the address translation module 720 may route communication from the first SAS expander 702 to the first SATA storage device 724 based upon a first LUN of the bridge chip 710 and a second LUN of the first SATA storage device 724. The address translation module 720 may invoke the SATA port multiplier 712 to route the communication through the first communication channel (e.g., connection 716). In another example, the address translation module 720 may route communication from the first SAS expander 702 to the second SATA storage device 722 based upon a first LUN of the bridge chip 710 and a third LUN of the second SATA storage device 722. The address translation module 720 may invoke the SATA port multiplier 712 to route the communication through the second communication channel (e.g., connection 718).

Figure 8:
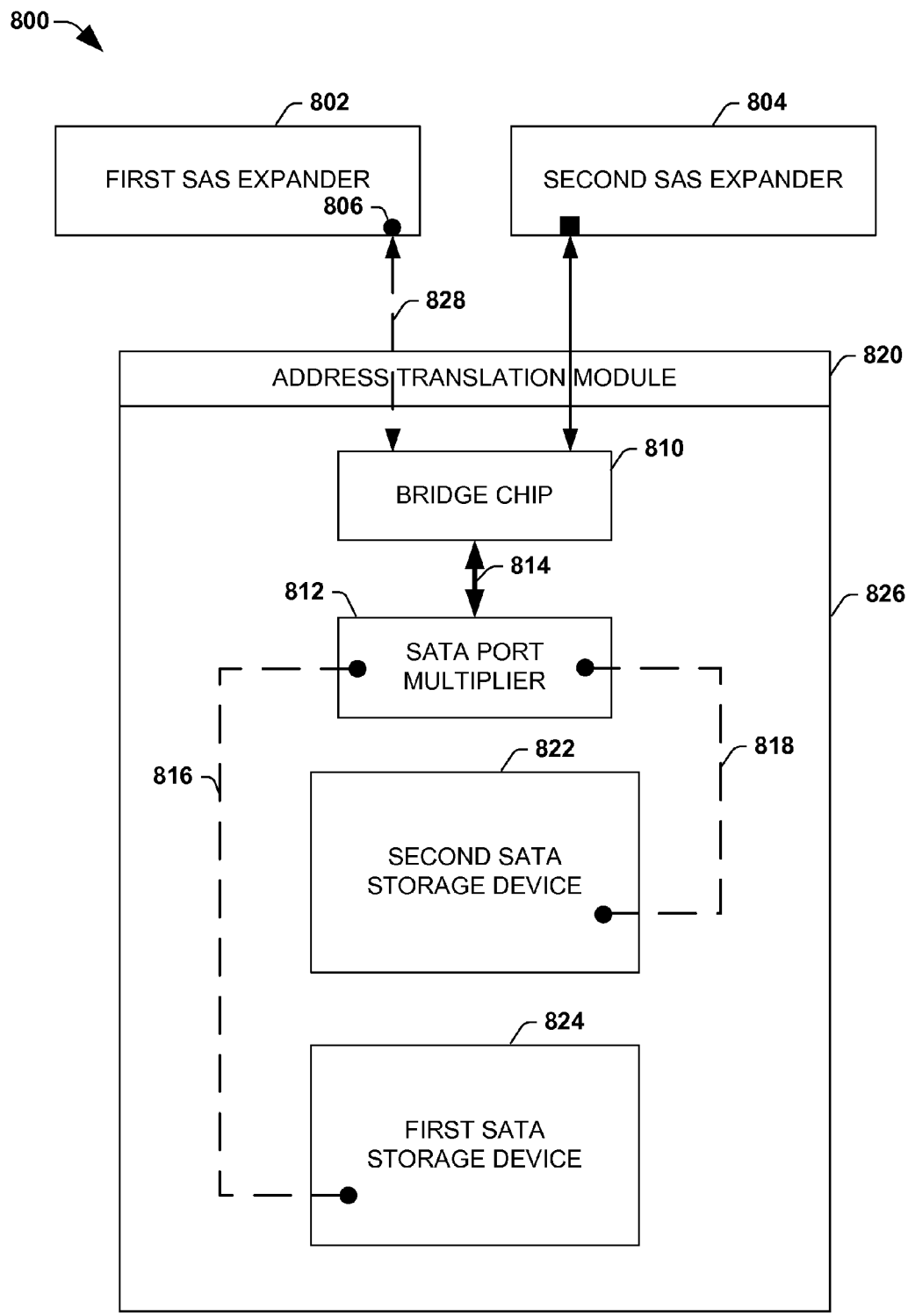
FIG. 8 is an illustration of an example of providing communication channels between a SAS communication port and two or more storage devices.

FIG. 8 illustrates an example 800 of providing communication channels between a SAS communication port and two or more SATA storage devices. A storage enclosure may comprise a first SAS expander 802, a second SAS expander 804, and/or a storage device carrier 826. The storage device carrier 826 may comprise a first SATA storage device 824 and a second SATA storage device 822.

A bridge chip 810 may be operatively coupled to a SAS communication port 806 of the first SAS expander 802 (e.g., connection 828). The bridge chip 810 may be operatively coupled to a SATA port multiplier 812 (e.g., connection 814). The SATA port multiplier 812 may be operatively coupled to the first SATA storage device 824 (e.g., connection 816). The SATA port multiplier 812 may be operatively coupled to the second SATA storage device 822 (e.g., connection 818).

The bridge chip 810 may be configured to provide a first communication channel between the first SAS expander 802 and the first SATA storage device 824. The first communication channel may comprise connection 828, connection 814, and connection 816. In one example of routing data communication, the first SAS expander 802 may receive a read operation from a storage server. The read operation may be formatted in a SAS format. An address translation module 802 may determine that the first SATA storage device 824 is the target. The read operation may be routed from the first SAS expander 802 through connection 828 to the bridge chip 810. The bridge chip 810 may translate the read operation from the SAS format into a SATA compatible format. The read operation may be routed from the bridge chip 810 through connection 814 to the SATA port multiplier 812. The read operation may be routed from the SATA port multiplier 812 through connection 816 to the first SATA storage device 824. It may be appreciated that data communication may be routed from the first SATA storage device 824 back to the storage server in a similar manner.

The bridge chip 810 may be configured to provide a second communication channel between the first SAS expander 802 and the second SATA storage device 822. The second communication channel may comprise connection 828, connection 814, and connection 818. In one example of routing data communication, the first SAS expander 802 may receive a read operation from a storage server. The read operation may be formatted in a SAS format. An address translation module 802 may determine that the second SATA storage device 822 is the target. The read operation may be routed from the first SAS expander 802 through connection 828 to the bridge chip 810. The bridge chip 810 may translate the read operation from the SAS format into a SATA compatible format. The read operation may be routed from the bridge chip 810 through connection 814 to the SATA port multiplier 812. The read operation may be routed from the SATA port multiplier 812 through connection 818 to the second SATA storage device 822. It may be appreciated that data communication may be routed from the second SATA storage device 822 back to the storage server in a similar manner.

Figure 9:
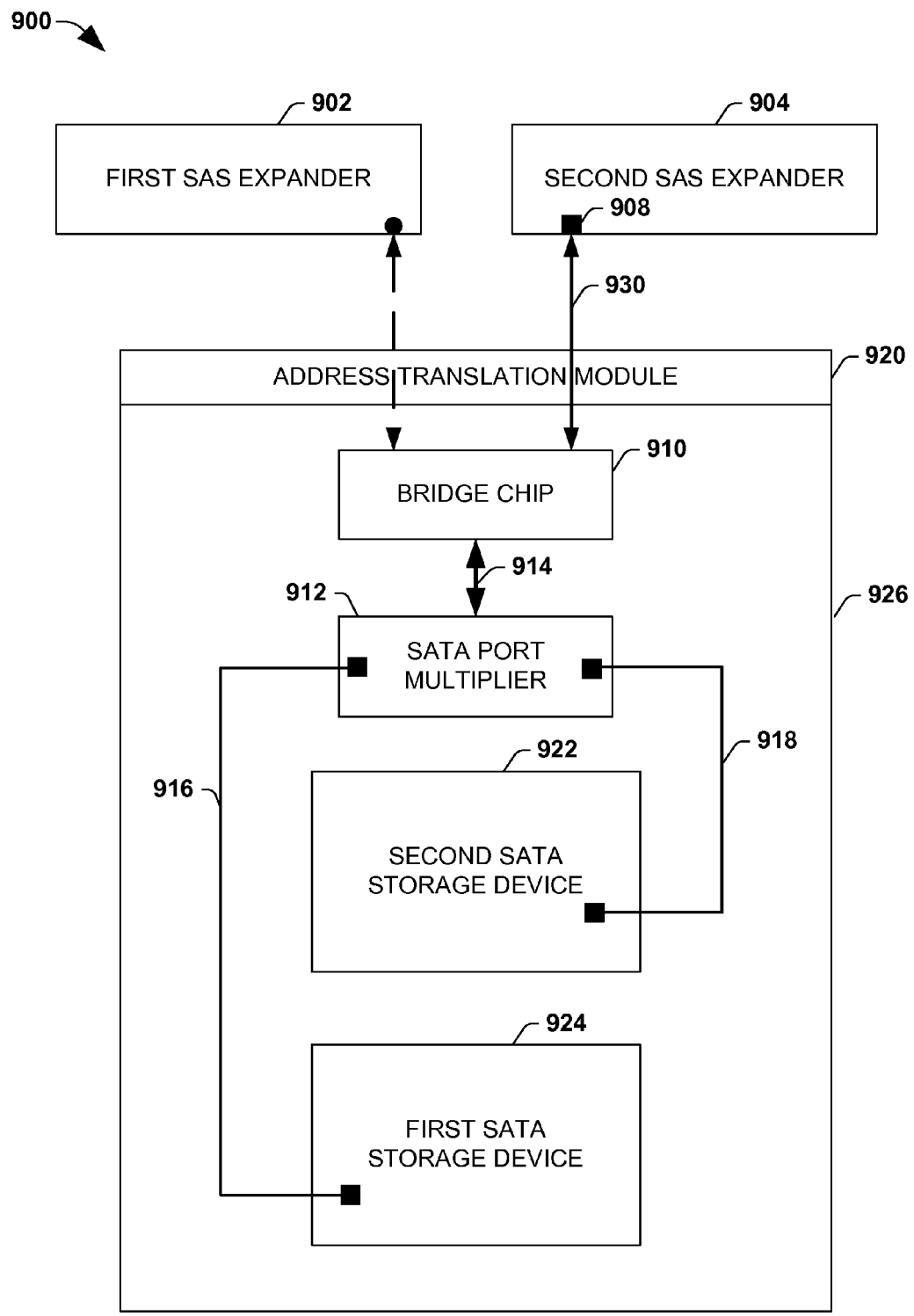
FIG. 9 is an illustration of an example of providing communication channels between a SAS communication port and two or more storage devices.

FIG. 9 illustrates an example 900 of providing communication channels between a SAS communication port and two or more SATA storage devices. A storage enclosure may comprise a first SAS expander 902, a second SAS expander 904, and/or a storage device carrier 926. The storage device carrier 926 may comprise a first SATA storage device 924 and a second SATA storage device 922.

A bridge chip 910 may be operatively coupled to a SAS communication port 908 of the second SAS expander 904 (e.g., connection 930). The bridge chip 910 may be operatively coupled to a SATA port multiplier 912 (e.g., connection 914). The SATA port multiplier 912 may be operatively coupled to the first SATA storage device 924 (e.g., connection 916). The SATA port multiplier 912 may be operatively coupled to the second SATA storage device 922 (e.g., connection 918).

The bridge chip 910 may be configured to provide a third communication channel between the second SAS expander 904 and the first SATA storage device 924. It may be appreciated that a first and second communication channel are illustrated in FIG. 8. The third communication channel may comprise connection 930, connection 914, and connection 916. In one example of routing data communication, the second SAS expander 904 may receive a read operation from a storage server. The read operation may be formatted in a SAS format. An address translation module 902 may determine that the first SATA storage device 924 is the target. The read operation may be routed from the second SAS expander 904 through connection 930 to the bridge chip 910. The bridge chip 910 may translate the read operation from the SAS format into a SATA compatible format. The read operation may be routed from the bridge chip 910 through connection 914 to the SATA port multiplier 912. The read operation may be routed from the SATA port multiplier 912 through connection 916 to the first SATA storage device 924. It may be appreciated that data communication may be routed from the first SATA storage device 924 back to the storage server in a similar manner.

The bridge chip 910 may be configured to provide a fourth communication channel between the second SAS expander 904 and the second SATA storage device 922. The fourth communication channel may comprise connection 930, connection 914, and connection 918. In one example of routing data communication, the second SAS expander 904 may receive a read operation from a storage server. The read operation may be formatted in a SAS format. An address translation module 920 may determine that the second SATA storage device 922 is the target. The read operation may be routed from the second SAS expander 904 through connection 930 to the bridge chip 910. The bridge chip 910 may translate the read operation from the SAS format into a SATA compatible format. The read operation may be routed from the bridge chip 910 through connection 914 to the SATA port multiplier 912. The read operation may be routed from the SATA port multiplier 912 through connection 918 to the second SATA storage device 922. It may be appreciated that data communication may be routed from the second SATA storage device 922 back to the storage server in a similar manner.

Figure 10:
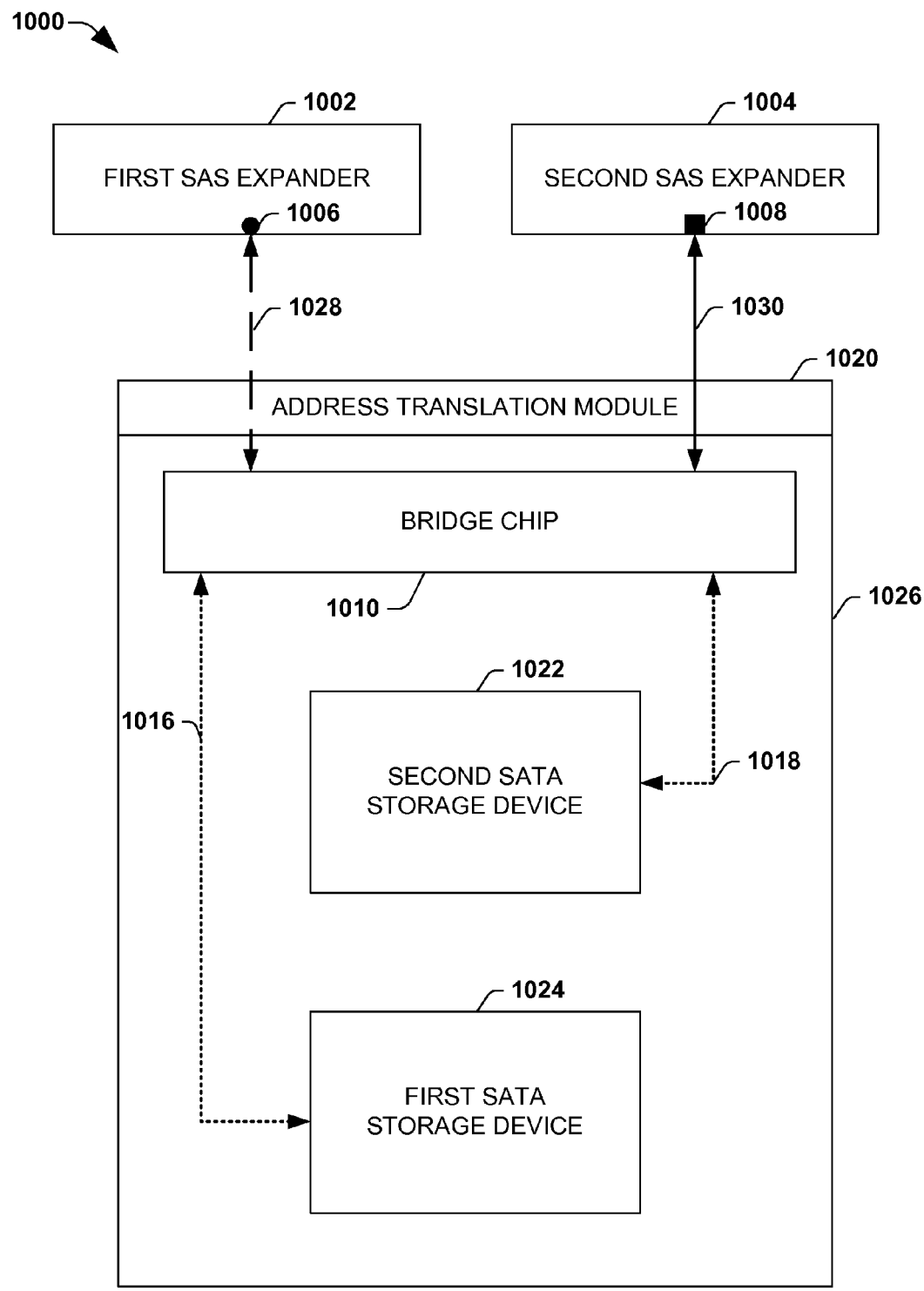
FIG. 10 is a component block diagram illustrating an exemplary system for enabling communication between a SAS communication port and two or more storage devices.

FIG. 10 illustrates an example of system 1000 configured to enable communication between a SAS communication port of a SAS expander and two or more SATA storage devices. A storage enclosure may comprise a first SAS expander 1002 and a storage device carrier 1026. The first SAS expander 1002 may comprise a SAS communication port 1006 and/or other SAS communication ports. The storage device carrier 1026 may comprise a first SATA storage device 1024 and a second SATA storage device 1022.

The system 1000 may comprise a bridge chip 1010. In one example, the bridge chip 1010 may comprise two SAS ports (e.g., a first port and a fourth port) and two SATA ports (e.g., a second port and a third port). Additionally, the bridge chip 1010 may be configured to translate communication between SAS and SATA in order to facilitate communication between SAS expanders and SATA storage devices.

The bridge chip 1010 may comprise a first port operatively coupled to a SAS communication port 1006 of the first SAS expander 1002 (e.g., connection 1028). The bridge chip 1010 may comprise a second port operatively coupled to the first SATA storage device 1024 (e.g., connection 1016). The bridge chip 1010 may comprise a third port operatively coupled to the second SATA storage device 1022 (e.g., connection 1018). The bridge chip 1010 may be configured to provide a first communication channel between the first SAS expander 1002 and the first SATA storage device 1024 using the first port and the second port (e.g., connection 1028 and connection 1016). The bridge chip may be configured to provide a second communication channel between the first SAS expander 1002 and the second SATA storage device 1022 using the first port and the third port (e.g., connection 1028 and connection 1018). In this way, the communication channels may be provided between the SAS communication port 1006 and two or more SATA storage devices, even though a single physical connection, for example, may be provided between the SAS communication port 1006 and the storage device carrier 1026.

The storage enclosure may comprise a second SAS expander 1004. The second SAS expander 1004 may comprise a SAS communication port 1008. The bridge chip 1010 may comprise a fourth port operatively coupled to the SAS communication port 1008 of the second SAS expander 1004 (e.g., connection 1030). The bridge chip 1010 may be configured to provide a third communication channel between the second SAS expander 1004 and the first SATA storage device 1024 using the fourth port and the second port (e.g., connection 1030 and connection 1016). The bridge chip 1010 may be configured to provide a fourth communication channel between the second SAS expander 1004 and the second SATA storage device 1022 using the fourth port and the third port (e.g., connection 1030 and connection 1018).

The system 1000 may comprise an address translation module 1020. It may be appreciated that logical unit numbers (LUNs) may be assigned to the bridge chip 1010, the first SATA storage device 1024, and/or the second SATA storage device 1022. For example, a first LUN may be assigned to the bridge chip 1010, a second LUN may be assigned to the first SATA storage device 1024, and/or a third LUN may be assigned to the second SATA storage device 1022. The address translation module 1020 may be configured to route communication from SAS expanders to target SATA storage devices. In one example, the address translation module 1020 may route communication from the first SAS expander 1002 to the first SATA storage device 1024 based upon a first LUN of the bridge chip 1010 and a second LUN of the first SATA storage device 1024. The address translation module 1020 may route the communication through the first communication channel (e.g., connection 1016). In another example, the address translation module 1020 may route communication from the first SAS expander 1002 to the second SATA storage device 1022 based upon a first LUN of the bridge chip 1010 and a third LUN of the second SATA storage device 1022. The address translation module 1020 route the communication through the second communication channel (e.g., connection 1018).

Figure 11:
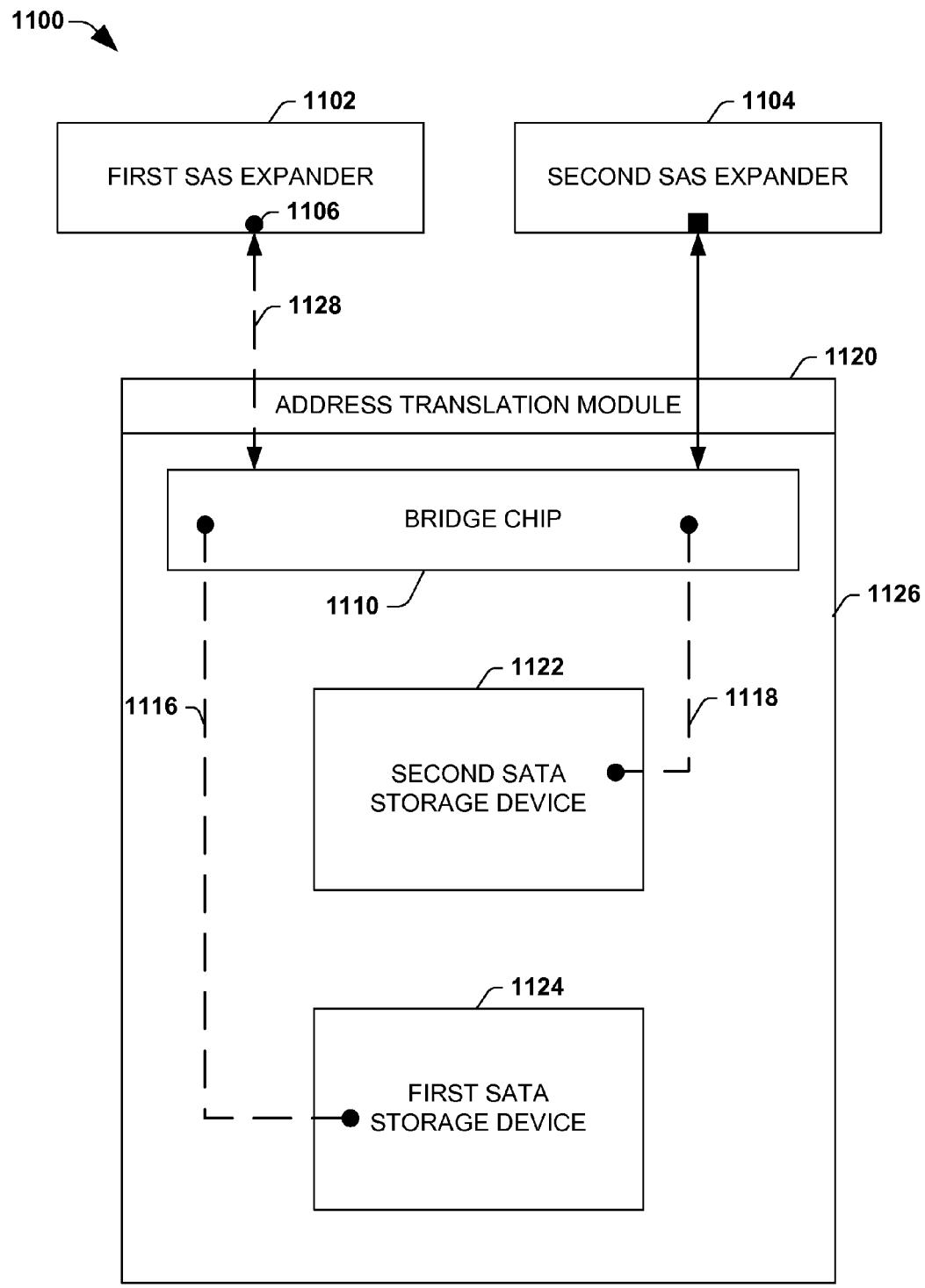
FIG. 11 is an illustration of an example of providing communication channels between a SAS communication port and two or more storage devices.

FIG. 11 illustrates an example 1100 of providing communication channels between a SAS communication port and two or more SATA storage devices. A storage enclosure may comprise a first SAS expander 1102, a second SAS expander 1104, and/or a storage device carrier 1126. The storage device carrier 1126 may comprise a first SATA storage device 1124 and a second SATA storage device 1122.

A bridge chip 1110 may comprise a first port operatively coupled to a SAS communication port 1106 of the first SAS expander 1102 (e.g., connection 1128). The bridge chip 1110 may comprise a second port operatively coupled to the first SATA storage device 1124 (e.g., connection 1116). The bridge chip 1110 may comprise a third port operatively coupled to the second SATA storage device 1122 (e.g., connection 1118).

The bridge chip 1110 may be configured to provide a first communication channel between the first SAS expander 1102 and the first SATA storage device 1124 using the first port and the second port. The first communication channel may comprise connection 1128 and connection 1116. In one example of routing data communication, the first SAS expander 1102 may receive a read operation from a storage server. The read operation may be formatted in a SAS format. An address translation module 1120 may determine that the first SATA storage device 1124 is the target. The read operation may be routed from the first SAS expander 1102 through connection 1128 to the bridge chip 1110. The bridge chip may translate the read operation from the SAS format into a SATA compatible format. The read operation may be routed from the bridge chip 1110 through connection 1116 to the first SATA storage device 1124. It may be appreciated that data communication may be routed from the first SATA storage device 1124 back to the storage server in a similar manner.

The bridge chip 1110 may be configured to provide a second communication channel between the first SAS expander 1102 and the second SATA storage device 1122 using the first port and the third port. The second communication channel may comprise connection 1128 and connection 1118. In one example of routing data communication, the first SAS expander 1102 may receive a read operation from a storage server. The read operation may be formatted in a SAS format. An address translation module 1102 may determine that the second SATA storage device 1122 is the target. The read operation may be routed from the first SAS expander 1102 through connection 1128 to the bridge chip 1110. The bridge chip 1110 may translate the read operation from the SAS format into a SATA compatible format. The read operation may be routed from the bridge chip 1110 through connection 1118 to the second SATA storage device 1122. It may be appreciated that data communication may be routed from the second SATA storage device 1122 back to the storage server in a similar manner.

Figure 12:
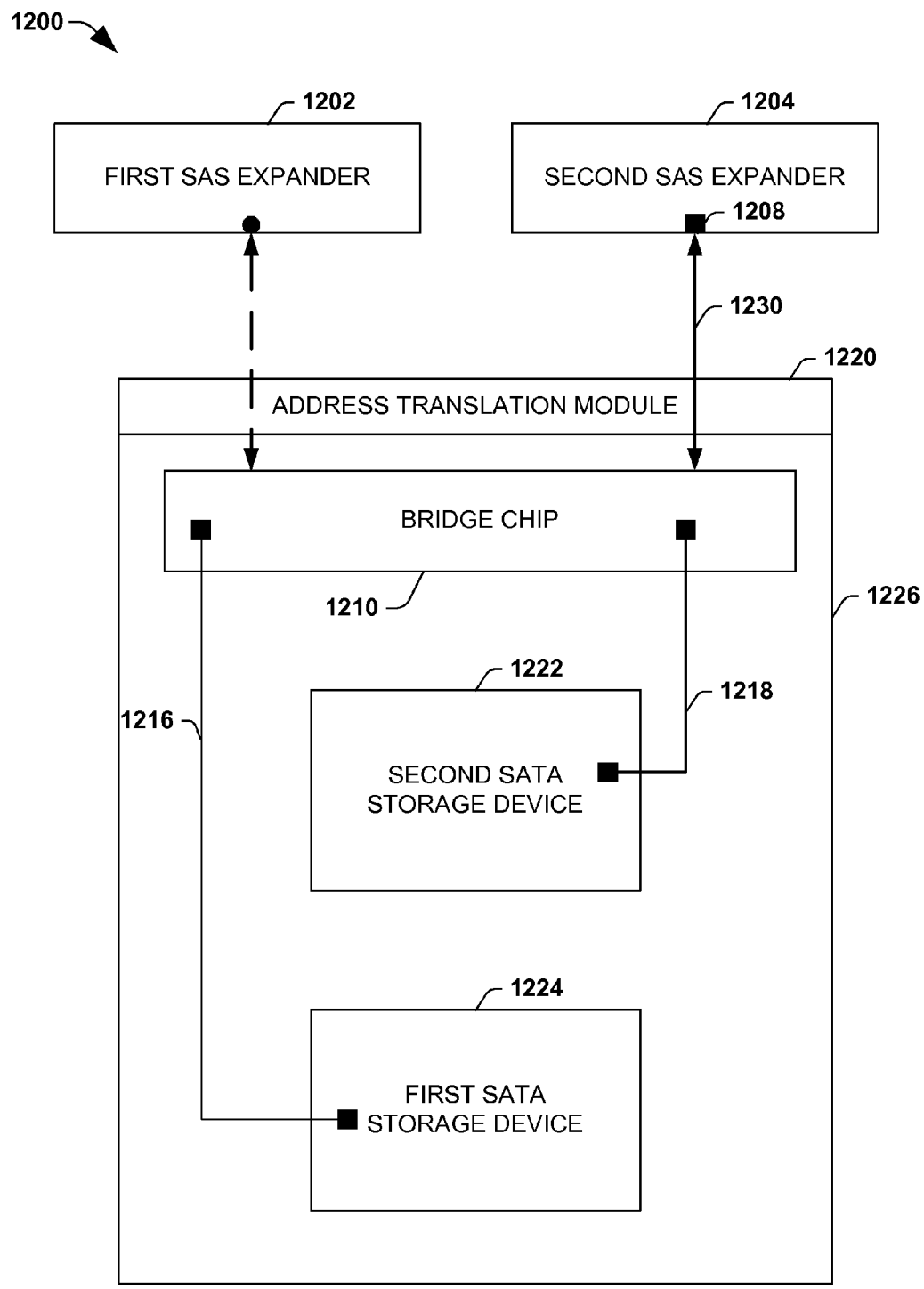
FIG. 12 is an illustration of an example of providing communication channels between a SAS communication port and two or more storage devices.

FIG. 12 illustrates an example 1200 of providing communication channels between a SAS communication port and two or more SATA storage devices. A storage enclosure may comprise a first SAS expander 1202, a second SAS expander 1204, and/or a storage device carrier 1226. The storage device carrier 1226 may comprise a first SATA storage device 1224 and a second SATA storage device 1222.

A bridge chip 1210 may comprise a fourth port operatively coupled to a SAS communication port 1208 of the second SAS expander 1204 (e.g., connection 1230). The bridge chip 1210 may comprise a second port operatively coupled to the first SATA storage device 1224 (e.g., connection 1216). The bridge chip 1210 may comprise a third port operatively coupled to the second SATA storage device 1222 (e.g., connection 1218).

The bridge chip 1210 may be configured to provide a third communication channel between the second SAS expander 1204 and the first SATA storage device 1224 using the fourth port and the second port. It may be appreciated that a first and second communication channel are illustrated in FIG. 11. The third communication channel may comprise connection 1230 and connection 1216. In one example of routing data communication, the second SAS expander 1204 may receive a read operation from a storage server. The read operation may be formatted in a SAS format. An address translation module 1220 may determine that the first SATA storage device 1224 is the target. The read operation may be routed from the second SAS expander 1204 through connection 1230 to the bridge chip 1210. The bridge chip 1210 may translate the read operation from the SAS format into a SATA compatible format. The read operation may be routed from the bridge chip 1210 through connection 1216 to the first SATA storage device 1224. It may be appreciated that data communication may be routed from the first SATA storage device 1224 back to the storage server in a similar manner.

The bridge chip 1210 may be configured to provide a fourth communication channel between the second SAS expander 1204 and the second SATA storage device 1222 using the fourth port and the third port. The fourth communication channel may comprise connection 1230 and connection 1218. In one example of routing data communication, the second SAS expander 1204 may receive a read operation from a storage server. The read operation may be formatted in a SAS format. An address translation module 1220 may determine that the second SATA storage device 1222 is the target. The read operation may be routed from the second SAS expander 1204 through connection 1230 to the bridge chip 1210. The bridge chip 1210 may translate the read operation from the SAS format into a SATA compatible format. The read operation may be routed from the bridge chip 1210 through connection 1218 to the second SATA storage device 1222. It may be appreciated that data communication may be routed from the second SATA storage device 1222 back to the storage server in a similar manner.

Figure 13:
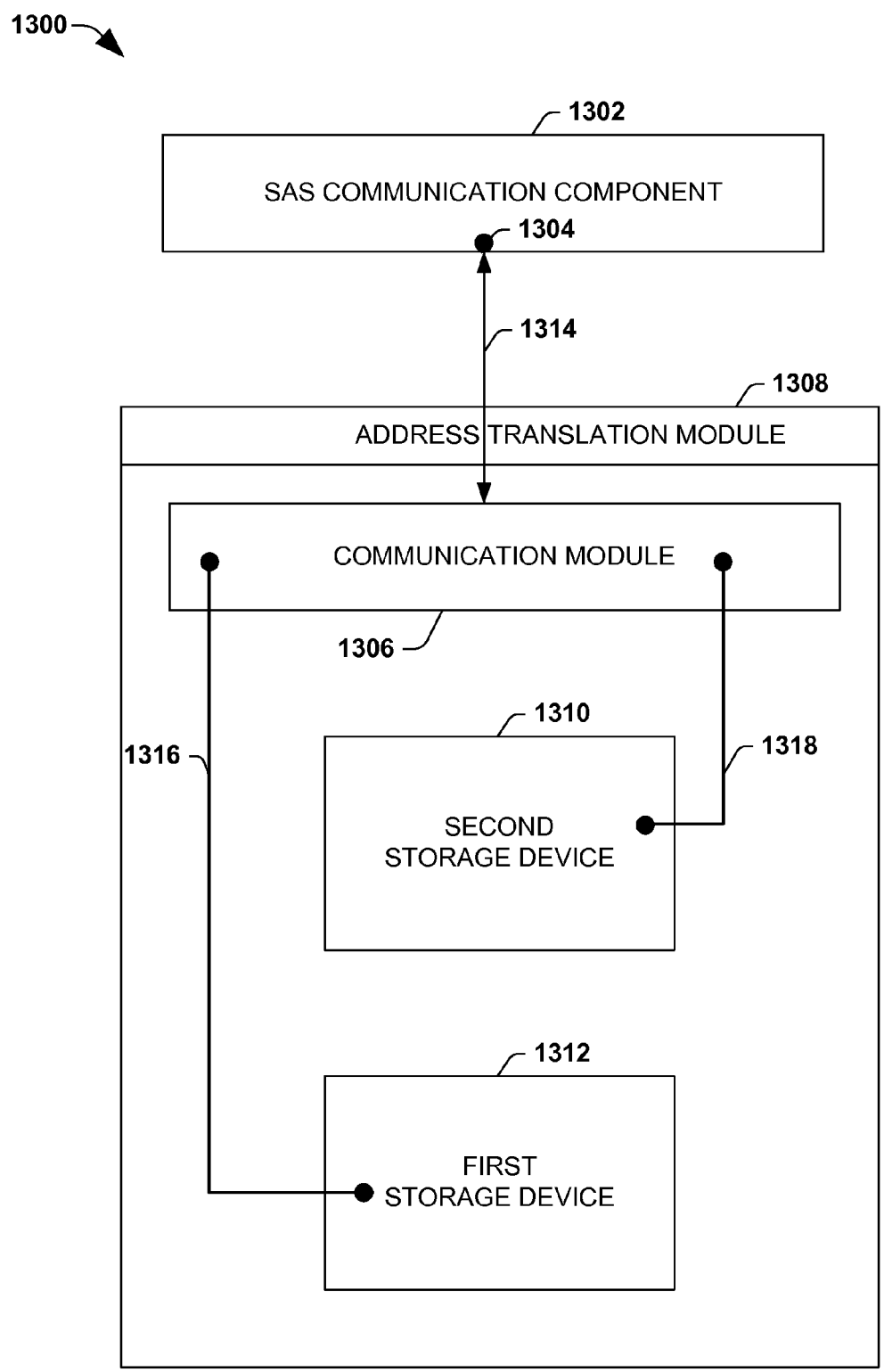
FIG. 13 is a component block diagram illustrating an exemplary system for enabling communication between a SAS communication port and two or more storage devices.

FIG. 13 illustrates an example of a system 1300 configured to enable communication between a SAS communication port 1304 of a SAS communication component 1302 and two or more storage devices. The system 1300 may comprise a communication module 1306. The communication module 1306 may be configured to provide a first communication channel between the SAS communication port 1304 of the SAS communication component 1302 and a first storage device 1312 represented by a first logical unit number (LUN). The first communication channel may comprise connection 1314 and connection 1316. The communication module 1306 may be configured to provide a second communication channel between the SAS communication port 1304 of the SAS communication component 1302 and the second storage device 1310 represented by a second logical unit number (LUN). The second communication channel may comprise connection 1314 and connection 1318. It may be appreciated that the communication module 1306 may be configured to provide plurality of communication channels between the SAS communication port 1304 and a plurality storage devices not illustrated.

The system 1300 may comprise an address translation module 1308. The address translation module 1308 may be configured to represent storage devices and/or portions thereof using logical unit numbers. That is, a plurality of storage devices physically connected through a single SAS communication port may be accessible to other components (e.g., a storage server, a host bus adapter controller chip, etc.) by referencing logical unit numbers corresponding to respective storage devices. For example, the address translation module 1308 may assign the first LUN to the first storage device 1312, the second LUN to the second storage device 1310, and/or other LUNs to other storage devices not illustrated. A storage server may be able to access the first storage device 1312 through the SAS communication port 1304 using the first LUN. Additionally, the storage server may be able to access the second storage device 1310 through the same SAS communication port 1304 using the second LUN. In this way, the address translation module 1308 may route the communication to the target storage device based upon logical unit numbers.

Figure 14:
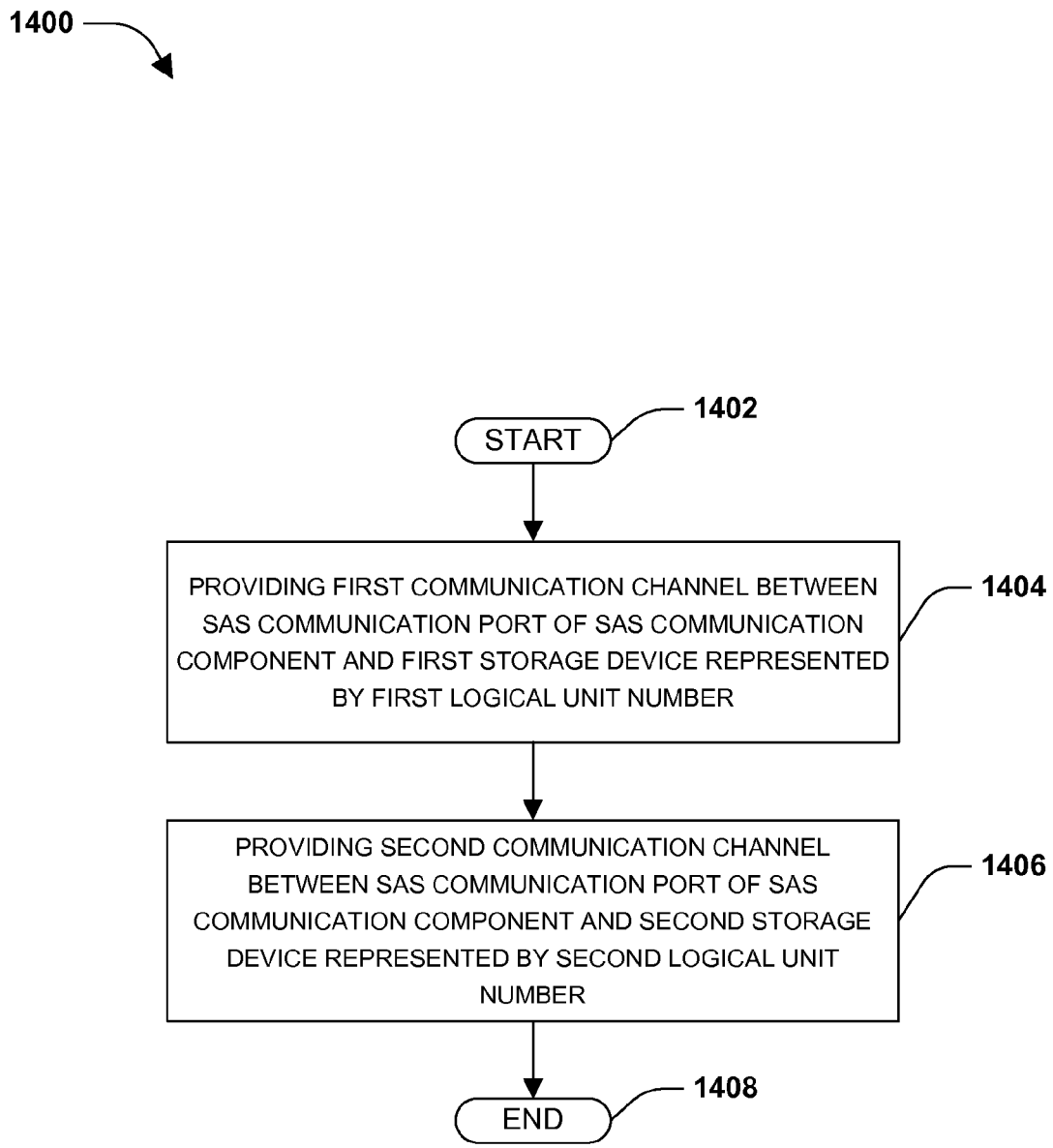
FIG. 14 is a flow chart illustrating an exemplary method of enabling communication between a SAS communication port and two or more storage devices.

One embodiment of enabling communication between a SAS communication port of a SAS communication component and two or more storage devices is illustrated by an exemplary method 1400 in FIG. 14. At 1402, the method starts. At 1404, a first communication channel may be provided between a SAS communication port of a SAS communication component and a first storage device represented by a first logical unit number. At 1406, a second communication channel may be provided between the SAS communication port of the SAS communication component and a second storage device represented by a second logical unit number. It may be appreciated that other communication channels may be provided between the SAS communication port and other storage devices not illustrated.

A first communication may be routed from the SAS communication port to the first storage device based upon the first logical unit number. In one example, the first communication may be routed through a first bridge chip. In another example, the first communication may be routed through a bridge chip and a port multiplier. In another example, the first communication may be routed through a first port and a second port of a bridge chip (e.g., a 4 port bridge chip with 2 SAS ports and 2 SATA ports). It may be appreciated that one or more bridge chips may translate between a SAS communication protocol and one or more of a variety of different communication protocols (e.g., SAS to SAS bridge chip, SAS to SATA bridge chip, SAS to Fibre Channel bridge chip, SAS to USB bridge chip, etc.).

A second communication may be routed from the SAS communication port to the second storage device based upon the second logical unit number. In one example, the second communication may be routed through a first bridge chip and a second bridge chip. In another example, the second communication may be routed through a bridge chip and a port multiplier. In another example, the second communication may be routed through a first port and a third port of a bridge chip (e.g., a second and/or fourth port of a 4 bridge chip may be reserved for routing communication to a first SATA storage device). At 1408, the method ends.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus, comprising:
a first bridge chip operatively coupled between a serial attached small computer system interface (SCSI) (SAS) communication port of a SAS expander and a first storage device, and configured to provide a first communication channel between the SAS expander and the first storage device; and
a second bridge chip operatively coupled between the first bridge chip and a second storage device, and configured to provide a second communication channel between the SAS expander and the second storage device through the SAS communication port and the first bridge chip, the second storage device different that the first storage device, and wherein the SAS expander is configured to be in communication with the second storage device only by way of the first bridge chip.

2. The apparatus of claim 1, the second bridge chip operatively coupled between another SAS communication port of another SAS expander and the second storage device.

3. The apparatus of claim 2, the second bridge chip configured to provide a third communication channel between the another SAS expander and the second storage device.

4. The apparatus of claim 2, the first bridge chip configured to provide a fourth communication channel between the another SAS expander and the first storage device through the another SAS communication port and the second bridge chip wherein the another SAS expander is configured to be in communication with the first storage device only by way of the second bridge chip.

5. The apparatus of claim 1, comprising an address translation module configured to route communication from the first SAS expander to the first storage device and to the second storage device.

6. The apparatus of claim 1, the first bridge chip comprising a first SAS to serial advanced technology attachment (SATA) bridge chip and the second bridge chip comprising a second SAS to SATA bridge chip and the first bridge chip, the second bridge chip, the first storage device, and the second storage device comprised within a storage device carrier.

7. An apparatus comprising a bridge chip comprising a first port operatively coupled to a serial attached small computer system interface (SCSI) (SAS) communication port of an SAS expander, a second port operatively coupled to a first storage device, and a third port operatively coupled to a second storage device, the bridge chip configured to provide a first communication channel between the SAS expander and the first storage device and a second communication channel between the SAS expander and the second storage device, the second storage device different than the first storage device, and communication between the SAS expander and the first and second storage devices occurring only through the bridge chip.

8. The apparatus of claim 7, comprising a fourth port operatively coupled to another SAS expander.

9. The apparatus of claim 8, configured to provide a third communication channel between the another SAS expander and the first storage device or a fourth communication channel between the another SAS expander and the second storage device.

10. The apparatus of claim 8, comprising an address translation module configured to route communication from the SAS expander or the another SAS expander to the first storage device or the second storage device.

11. The apparatus of claim 7, the bridge chip represented by a first logical unit number, the first storage device represented by a second logical unit number, and the second storage device represented by a third logical unit number.

12. The apparatus of claim 1, the first bridge chip represented by a first logical unit number, the second bridge chip represented by a second logical unit number, the first storage device represented by a third logical unit number, and the second storage device represented by a fourth logical unit number.

* * * * *